United States Patent [19]

Bauer et al.

[11] Patent Number: 4,562,595
[45] Date of Patent: Dec. 31, 1985

[54] FRONT PANEL FOR ELECTRONIC DEVICE SUCH AS AN AUTOMOTIVE RADIO AND METHOD FOR INSTALLING SAME

[75] Inventors: Martin W. Bauer, Elmhurst; Carl J. Thys, Chicago; Peter A. Fredriksen, Prospect Hts.; David J. Robin, Elmhurst; Richard J. Schaar, Northbrook, all of Ill.

[73] Assignee: International Jensen Incorporated, Schiller Park, Ill.

[21] Appl. No.: 568,735

[22] Filed: Jan. 6, 1984

[51] Int. Cl.$^4$ ............................................. H04B 1/08
[52] U.S. Cl. .................................... 455/345; 455/349; 312/7.1
[58] Field of Search ............... 455/345, 347, 348, 349; 312/7.1, 245, 246, 248; 248/27.1, 27.3; 369/10, 12

[56] References Cited

U.S. PATENT DOCUMENTS

| | | | |
|---|---|---|---|
| 3,685,879 | 8/1972 | Tsuji | 312/7.1 |
| 3,906,371 | 9/1975 | Tsuji | 455/347 |
| 3,922,047 | 11/1975 | Tsuji | 312/7.1 |
| 4,067,654 | 1/1978 | Maniaci | 455/345 |
| 4,211,976 | 7/1980 | Inoue | 455/345 |
| 4,462,564 | 7/1984 | Alves et al. | 248/27.1 |

Primary Examiner—Jin F. Ng
Attorney, Agent, or Firm—Willian, Brinks, Olds, Hofer, Gilson & Lione, Ltd.

[57] ABSTRACT

A front panel assembly for an automotive radio is disclosed which includes a central control panel, a left side control panel, and a right side control panel, each of which includes a respective plurality of control switches. Conductors, such as flexible conductors, are provided for interconnecting the control switches on the two side control panels with the radio. In addition, the side control panels are removably mountable on the left and right sides of the central control panel after the radio has been mounted in place in order to mask mounting hardware. In the preferred method of this invention, a front panel of the type described above is mounted by first positioning the left and right side control panels over the central control panel, and then passing the central, left side and right side control panels through a central opening in a mounting panel. After the radio has been secured in place, the left and right side control panels are moved from their initial position over the central control panel to positions on either side of the control panel. The left and right side control panels are then secured in place.

9 Claims, 9 Drawing Figures

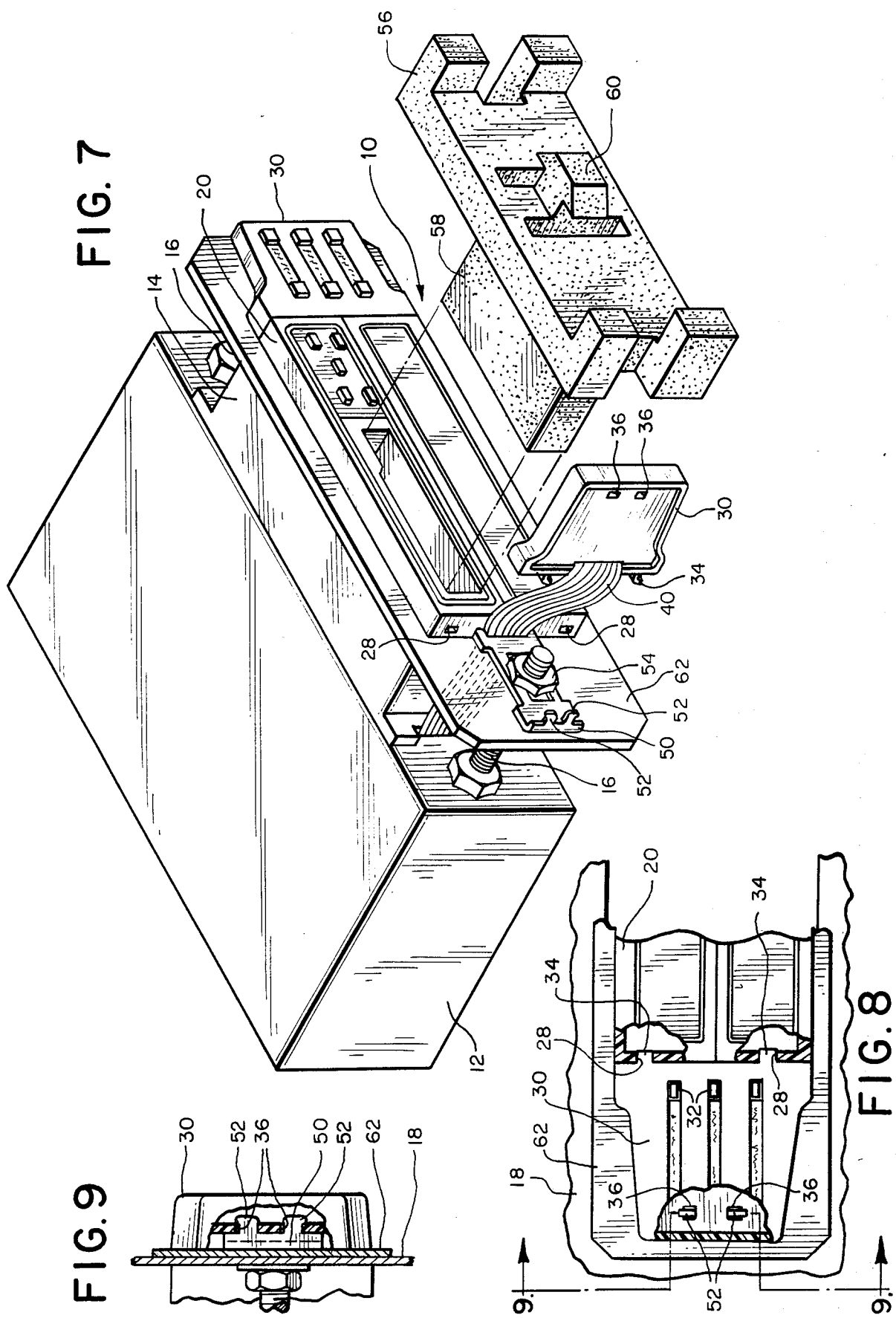

FRONT PANEL FOR ELECTRONIC DEVICE SUCH AS AN AUTOMOTIVE RADIO AND METHOD FOR INSTALLING SAME

BACKGROUND OF THE INVENTION

The present invention relates to an improved front panel assembly for an electronic device such as an automotive radio, which front panel provides particular ease of installation.

Automotive radios are typically installed behind instrument panels. In one prior art approach a radio is provided with a central control panel and two mounting posts, one on either side of the central control panel. The radio is typically mounted to the instrument panel from behind by pushing the central control panel and the two mounting posts through preformed openings in the instrument panel. Installation is then completed by installing cover plates to cover the openings in the instrument panel and then installing knobs on the mounting posts. This prior art approach provides a radio of conventional appearance; that is, a central control panel bracketed on both sides by knobs.

This prior art approach provides the disadvantage that cover plates suitable for each intended installation must be provided with the radio. Furthermore, the use of knobs on either side of the central control panel may not be optimal for modern electronic radios in which a relatively large number of push button controls may be required.

SUMMARY OF THE INVENTION

The present invention is directed to an improved front panel assembly which is easy to install and which entirely masks the mounting posts on either side of the central control panel.

According to the apparatus of this invention, a front panel for an automotive radio having left and right front mounting brackets is provided which comprises a central control panel having a first plurality of control switches electronically connected to the radio, a left side control panel having a second plurality of control switches, and a right side control panel having a third plurality of control switches. Left and right conductor means are provided for interconnecting the second and third plurality of control switches, respectively, with the radio. In addition, means are provided for releasably mounting the left and right side control panels over the left and right front mounting brackets on respective sides of the control panel after the radio has been mounted in place in order to mask the mounting brackets.

According to the method of this invention, a radio of the type described above is installed by first positioning the left and right side control panels over the central control panel. Then the central, left side, and right side control panels are passed through a central opening in a mounting panel and the left and right front mounting brackets are passed through respective side openings in the mounting panel. After the left and right front mounting brackets have been secured to the mounting panel, the left side and right side control panels are moved from their initial position over the central control panel to positions over the respective front mounting brackets. Then the left side and right side control panels are secured in place over the left and right front mounting brackets in order to mask the mounting brackets.

The present invention provides a front panel and method of installation which are easy and quick to use, yet which provide important advantages in terms of increased area for electronic controls such as switch controls on the side control panels. Furthermore, the front panel and method of this invention provide a radio which presents an appearance markedly different from the central control panel plus two knobs appearance of the standard prior art devices.

BRIEF DESCRIPTION OF THE DRAWINGS

FIG. 7 is a perspective view corresponding to FIG. 3 showing the embodiment of FIG. 1 during installation.

FIG. 8 is a front view in partial cutaway of one of the side control panels as installed.

FIG. 9 is a sectional view taken along line 9—9 of FIG. 8.

DETAILED DESCRIPTION OF THE PRESENTLY PREFERRED EMBODIMENTS

Turning now to the drawings, FIGS. 1-9 show various views of a presently preferred embodiment 10 of the control panel of this invention, and of the method of installing this control panel.

Figure 1:
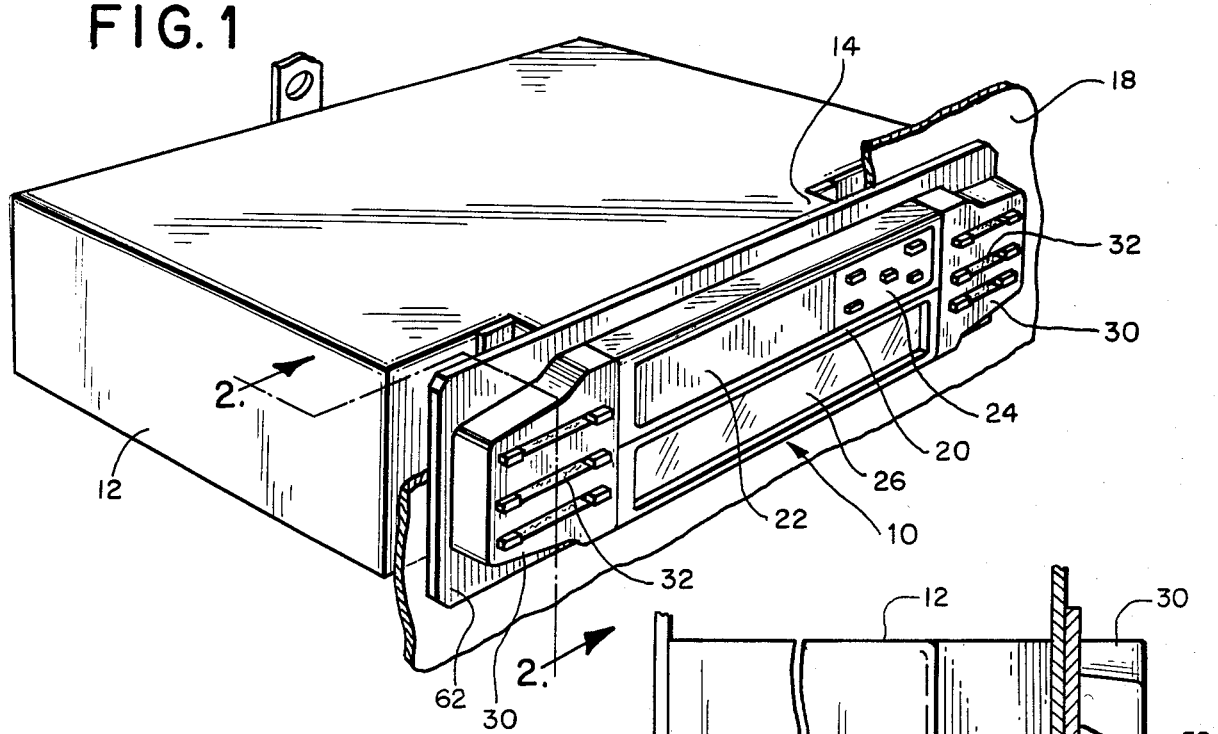
FIG. 1 is a perspective view of an automotive radio which incorporates a presently preferred embodiment of this invention.
Figure 2:
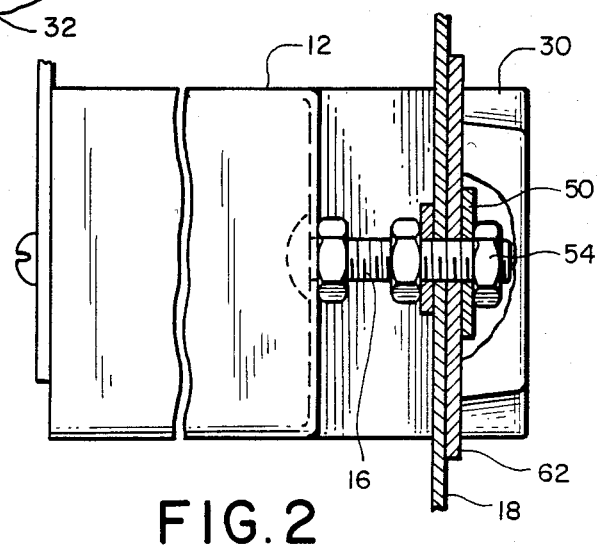
FIG. 2 is a sectional view taken along line 2—2 of FIG. 1.
Figure 5:
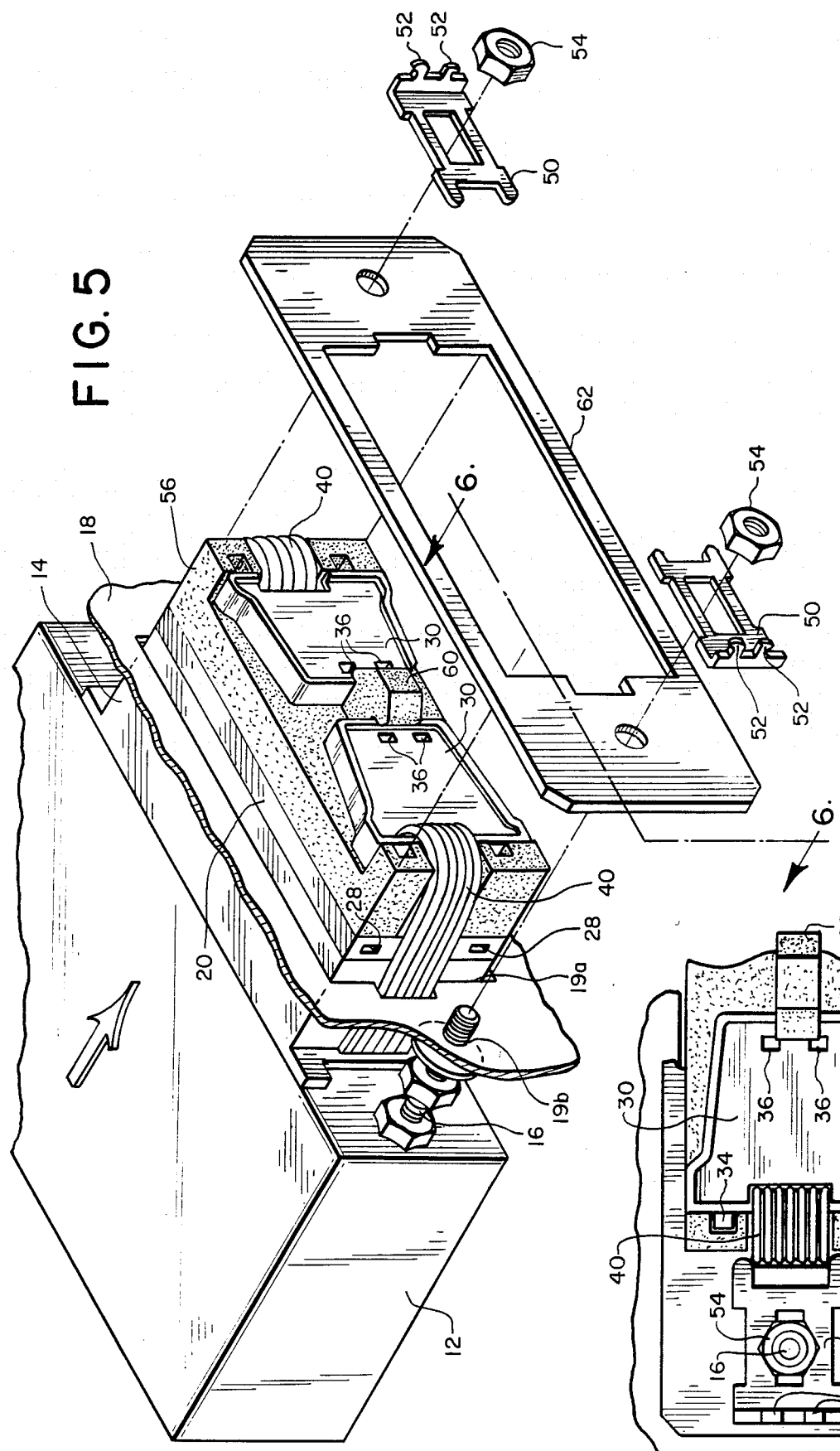
FIG. 5 is an exploded perspective view showing the embodiment of FIG. 1 prior to installation in a mounting panel.

As shown for example in FIGS. 1, 5 and 7, the front panel 10 is included on an automotive radio 12 which may be any suitable conventional radio. The radio 12 includes a central protruding nose 14 and two front mounting brackets 16 which are generally configured as posts. It should be understood that the elements 12-16 may be embodied as standard prior art devices well known to those skilled in the art, and that they do not per se form part of this invention. For this reason, they will not be described in greater detail here.

As best seen in FIG. 1, the control panel 10 includes a central control panel 20. The central control panel 20 includes an array of control buttons 24, and a cassette door 22 through a standard tape cassette can be introduced into and removed from the radio 12. A liquid crystal display 26 is provided under the tape door 22 to display operating parameters such as the frequency of the channel currently being received by the radio 12. In this preferred embodiment, the control buttons 24 are provided for switching such functions as fast forward, rewind, and play when in the tape cassette mode, and manually initiated up or down digital tuning and AM/FM selection when in the radio reception mode. In addition, the central control panel 20 defines two recesses 28 (FIGS. 7 and 8) on each side of the central control panel 20. The function of these recesses 28 will be described below in conjunction with the side control panels 30.

Figure 3:
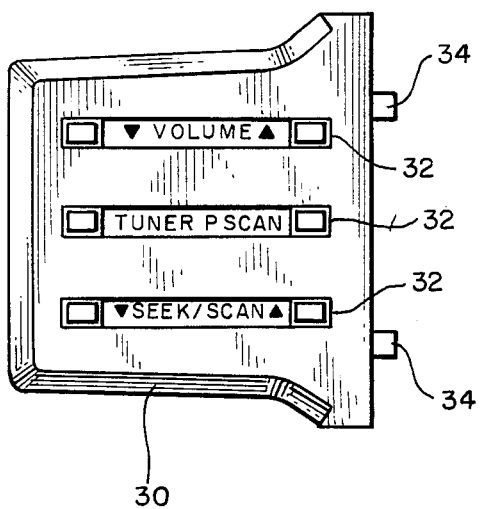
FIG. 3 is an enlarged front view of one of the side control panels included in the embodiment of FIG. 1.
Figure 4:
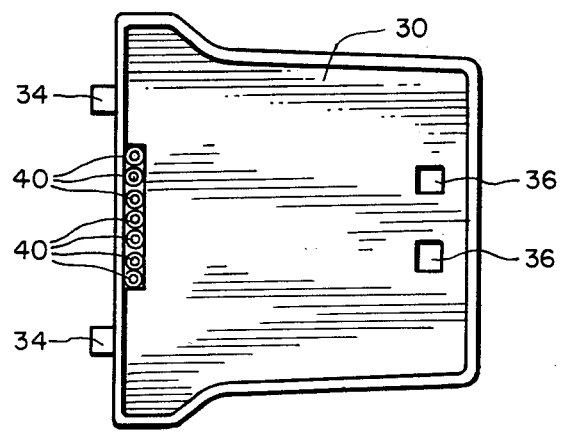
FIG. 4 is an enlarged rear view of the side control panel of FIG. 3.

The control panel 10 also includes two side control panels 30 each of which serves to mount a respective set of control switches 32. As best shown in FIGS. 3 and 4, each of the side control panels defines a pair of protruding lugs 34 on the side adjacent to the central control panel 20, as well as a pair of openings 36 on the side facing the mounting panel 18 and spaced from the central control panel 20. In this preferred embodiment the control switches 32 on the right side control panel 30 are six digital switches which are used to select any one of six preprogrammed AM or FM reception frequencies. The control switches 32 in this preferred embodiment on the left side control panel 30 include at least two digital volume switches for raising or lowering the volume of the radio 12 to seek a next station of either higher or lower frequency (in accordance with the selected switch) than the currently received frequency. If desired, additional functions can be implemented on two additional digital switches included in the control switches 32 on the left side control panel 30.

It should be clearly understood that in this preferred embodiment each of the side control panels 30 can be mechanically disconnected from the central control panel 20. The control switches 32 are electrically connected with the radio 12 by means of flexible conductors 40. In this preferred embodiment the flexible conductors 40 are formed as ribbons of insulated conductors extending between the respective side control panels 30 and the radio 12. In alternate embodiments, the flexible conductors 40 can pass through the nose (14) or be replaced by electrical connectors which operate to connect the control switches 32 with the radio 12.

Turning now to FIGS. 5-9, the embodiment described above can readily be mounted in a mounting panel 18 in the following manner. First, a mounting panel 18 is provided which includes a central opening 19a sized to receive the nose 14 and the central control panel 20, as well as two side openings 19b sized to receive respective ones of the front mounting brackets 16. Then the radio 12 is positioned with the two side control panels 30 positioned over the central control panel 32, as shown in FIG. 5.

Figure 6:
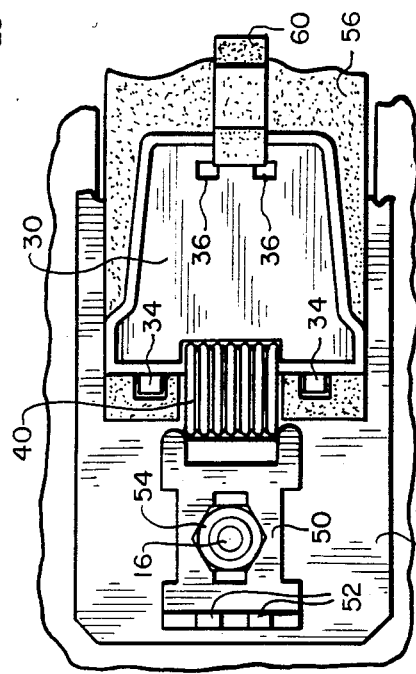
FIG. 6 is a front view taken along line 6—6 of FIG. 5.

In FIG. 5 the reference numeral 56 is used to refer to a resilient foam installation fixture. This installation fixture 56 includes a blade 58 sized to fit within the tape door 22 into the recess normally occupied by a tape cassette. Thus, the blade 58 holds the installation fixture 56 in place against the front of the central control panel 20. The installation fixture 56 also includes a central locking post 60 which holds the two side control panels 30 in place over the front of the central control panel 20. FIGS. 5 and 6 show the installation fixture 56 in use prior to mounting of the radio 12.

The next step is to pass the central control panel 20, the installation fixture 56, and the two side control panels 30 through the central opening 19a. Simultaneously, the two front mounting brackets 16 pass through the side openings 19b. If desired, a frame 62 can be positioned in place. Then plates 50 are positioned on the front side of the mounting panel 18 over the front mounting brackets 16, and the plates 50 as well as the front mounting brackets 16 are secured in place against the mounting panel 18 by means of suitable mounting hardware 54. As shown in FIG. 5, each of the plates 50 defines a pair of locking fingers 52. In this preferred embodiment, the plates 50 and the locking fingers 52 are formed of spring metal, and the locking fingers 52 are provided with beveled upper surfaces as shown in the drawings.

After the mounting hardware 54 has been secured in place, the rear of the radio 12 may be attached to other portions of the automobile by standard means (not shown). Then, each of the side control panels 30 is removed from the installation fixture 56 and rotated until the lugs 34 fit within the recesses 28 on the respective side of the central control panel 20. Once these lugs 34 are firmly in place, the side control panel 30 is pushed against the mounting panel 18 such that the locking fingers 52 are inserted within the respective openings 36. The openings 36 are configured to lock against the locking fingers 52, as shown in FIGS. 8 and 9. Thus, the side control panels 30 snap in place on the locking fingers 52, thereby completing assembly. After the side control panels 30 have been mounted in place, the front panel 10 provides the overall appearance shown in FIG. 1. Of course, the installation fixture 56 can be removed and discarded after the side control panels 30 are mounted firmly in place.

From the foregoing description it should be apparent that a front panel assembly has been described which is simple to install. A wide, large area, front panel assembly is provided which can readily be used with small central openings of the type which are common in the prior art. Furthermore, because the side control panels 30 fit over the front mounting brackets 16, the appearance of the front panel assembly can be made to depart significantly from the conventional prior art design of a single central panel with two outboard knob assemblies. In some applications, the frame 62 may be eliminated.

Of course, it should be understood that the present invention is not limited to the precise geometry or proportions shown in the drawings. To the contrary, this invention can be used with a wide variety of types of control switches and panel layouts. In addition, this invention is well suited for use with a wide variety of types of automotive radios, whether or not they include tape cassette players.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. A front panel for a radio having left and right front mounting brackets, said front panel comprising:
   a central control panel having a first plurality of control switches electrically connected to the radio;
   a left side control panel having a second plurality of control switches;
   a right side control panel having a third plurality of control switches;
   left conductor means for interconnecting the second plurality of control switches with the radio;
   right conductor means for interconnecting the third plurality of control switches with the radio; and
   means for releasably mounting the left and right side control panels over the left and right front mounting brackets on respective sides of the central control panel to mask the mounting brackets such that the left and right side control panels can be mounted over the respective mounting brackets after the radio has been mounted in place to a mounting panel.

2. The invention of claim 1 wherein the releasably mounting means comprises:
   means for defining recesses in the radio on both sides of the central control panel;
   means for defining locking fingers extending away from the mounting brackets;
   means for defining lugs in the left and right side control panels sized to fit within respective ones of the recesses; and
   means for defining openings in the left and right side control panels sized to receive respective ones of the locking fingers.

3. The invention of claim 1 wherein the left and right conductor means comprise respective flexible conductors.

4. The invention of claim 1 wherein the radio is an automotive radio.

5. A method for installing a radio in a mounting panel having a central opening and two side openings; said radio comprising left and right front mounting brackets and a front panel; said front panel comprising: a central control panel having a first plurality of control switches electrically connected to the radio; a left side control panel having a second plurality of control switches; a right side control panel having a third plurality of control switches; left flexible conductor means for interconnecting the second plurality of control switches with the radio; right flexible conductor means for interconnecting the third plurality of control switches with the radio; and means for releasably mounting the left and right side control panels over the left and right front mounting brackets on respective sides of the central control panel to mask the mounting brackets;
   (a) positioning the left and right side control panels over the central control panel;
   (b) passing the central, left side, and right side control panels through the central opening and the left and right front mounting brackets through the respective side openings;
   (c) securing the left and right front mounting brackets to the mounting panel;
   (d) moving the left and right side control panels from over the central control panel to positions over the respective front mounting brackets; and
   (e) securing the left and right side control panels in place over the left and right front mounting brackets in order to mask the mounting brackets.

6. The method of claim 5 wherein the releasably mounting means comprises:
   means for defining recesses in the radio on both sides of the central control panel;
   means for defining locking fingers extending away from the mounting brackets;
   means for defining lugs in the left and right side control panels sized to fit within respective ones of the recesses; and
   means for defining openings in the left and right side control panels sized to receive respective ones of the locking fingers;
and wherein the side control panel securing step comprises the following steps:
   positioning the lugs on the side control panels within respective ones of the recesses; and
   pushing the side panels toward the locking fingers to cause the locking fingers to enter the openings and lock the side panels in place.

7. The invention of claim 5 wherein the left and right conductor means comprise respective flexible conductors.

8. The invention of claim 5 wherein step (a) comprises the following steps:
   providing an installation fixture which comprises means for releasably holding the left and right side control panels to the fixture;
   mounting the fixture over the central control panel; and
   placing the left and right side control panels in the holding means.

9. The invention of claim 5 wherein the mounting panel is an automotive instrument panel.

* * * * *

UNITED STATES PATENT AND TRADEMARK OFFICE
CERTIFICATE OF CORRECTION

PATENT NO. : 4,562,595

DATED : December 31, 1985

INVENTOR(S) : Martin W. Bauer et al.

It is certified that error appears in the above-identified patent and that said Letters Patent is hereby corrected as shown below:

In column 3, line 15, after "radio 12" please insert --and two digital seek/scan switches for causing the radio 12--.

Signed and Sealed this

Tenth Day of May, 1988

Attest:

DONALD J. QUIGG

Attesting Officer

Commissioner of Patents and Trademarks